(12) United States Patent
Tomescu et al.

(10) Patent No.: US 11,127,375 B2
(45) Date of Patent: Sep. 21, 2021

(54) SYSTEMS AND METHODS FOR GRAPHICAL LAYER BLENDING

(71) Applicant: FREESCALE SEMICONDUCTOR INC, Austin, TX (US)

(72) Inventors: Cristian Corneliu Tomescu, Bucharest (RO); Dragos Papava, Bucharest (RO)

(73) Assignee: NXP USA, INC., Austin, TX (US)

( * ) Notice: Subject to any disclaimer, the term of this patent is extended or adjusted under 35 U.S.C. 154(b) by 614 days.

(21) Appl. No.: 14/943,613

(22) Filed: Nov. 17, 2015

(65) Prior Publication Data
US 2017/0076702 A1    Mar. 16, 2017

(30) Foreign Application Priority Data
Sep. 14, 2015 (RO) ............................. a 2015 00660

(51) Int. Cl.
*G09G 5/36* (2006.01)
*G06T 1/60* (2006.01)
*G06T 11/60* (2006.01)
*G09G 3/20* (2006.01)

(52) U.S. Cl.
CPC .............. *G09G 5/363* (2013.01); *G06T 1/60* (2013.01); *G06T 11/60* (2013.01); *G06T 2207/20221* (2013.01); *G09G 3/2003* (2013.01); *G09G 2340/10* (2013.01); *G09G 2360/18* (2013.01)

(58) Field of Classification Search
CPC . G06T 11/60; G06T 1/60; G06T 2207/20221; H04N 21/234327; H04N 21/42653; G09G 2340/12; G09G 5/14; G06F 11/1004
USPC ......................................................... 345/629
See application file for complete search history.

(56) References Cited

U.S. PATENT DOCUMENTS

| | | | |
|---|---|---|---|
| 5,546,518 A * | 8/1996 | Blossom | G06T 15/503 345/473 |
| 5,896,136 A | 4/1999 | Augustine et al. | |
| 6,061,048 A * | 5/2000 | Choi | G09G 1/167 345/24 |
| 6,741,794 B1 | 5/2004 | Sumioka et al. | |
| 7,978,162 B2 * | 7/2011 | Maruoka | G09G 3/2011 345/100 |
| 8,687,014 B2 | 4/2014 | Coupe et al. | |
| 2002/0145601 A1 * | 10/2002 | Mino | G09G 5/006 345/211 |
| 2005/0140809 A1 * | 6/2005 | Lim | H04N 5/23203 348/333.01 |
| 2007/0002072 A1 * | 1/2007 | Frensch | G06T 3/4023 345/587 |
| 2007/0053620 A1 * | 3/2007 | Mizuno | H04N 19/46 384/240 |
| 2009/0185083 A1 * | 7/2009 | Ohtoshi | G02F 1/13471 348/740 |

(Continued)

*Primary Examiner* — Jin Cheng Wang

(57) ABSTRACT

The embodiments described herein provide devices and methods for image processing. Specifically, the embodiments described herein provide techniques for blending graphical layers together into an image for display. In general, these techniques utilize multiple display control units to blend together more layers than could be achieved using a single display control unit. This blending of additional layers can provide improved image quality compared to traditional techniques that use only the blending capability of a single display control unit.

3 Claims, 3 Drawing Sheets

(56) References Cited

U.S. PATENT DOCUMENTS

| | | | | |
|---|---|---|---|---|
| 2010/0045691 A1* | 2/2010 | Naito | ............ | G09G 5/36 |
| | | | | 345/581 |
| 2012/0036418 A1* | 2/2012 | Morino | ............ | G06F 11/1004 |
| | | | | 714/807 |
| 2012/0092542 A1* | 4/2012 | Kitano | ............ | H04N 5/23293 |
| | | | | 348/333.01 |
| 2015/0109330 A1* | 4/2015 | Staudenmaier | ....... | G06T 11/60 |
| | | | | 345/629 |
| 2015/0317926 A1* | 11/2015 | Leeman | ............ | G06F 3/1446 |
| | | | | 345/522 |
| 2017/0053620 A1* | 2/2017 | Law | ............ | G09G 5/363 |

* cited by examiner

SYSTEMS AND METHODS FOR GRAPHICAL LAYER BLENDING

CROSS-REFERENCE TO RELATED APPLICATION

This application claims priority to Romanian Patent Application No. A2015/00660, filed Sep. 14, 2015, which is incorporated herein by reference in its entirety.

TECHNICAL FIELD

Embodiments described herein relate generally to graphical processing, and more specifically relate to graphical layer blending.

BACKGROUND

Processing devices, also sometimes referred to as processors, processing units, or microprocessors, are devices that utilize integrated circuits to perform a variety of functions. For example, some processing devices include integrated circuits designed to execute programs stored in a memory. Some processing devices include application-specific integrated circuits (ASICs) designed for particular use cases. Central processing units (CPUs) are types of general purpose processors that provide the central processing functionality of typical computers. System on Chip (SoC) processors can integrate a wide variety of components of a system into a single chip. Such devices may include digital, analog, mixed signal and other functions on a single chip substrate.

A typical modern processing unit will include multiple processor elements, and may include multiple hardware processor elements. In a typical implementation, each processor element can execute instructions independently. Multiple processor elements can thus run multiple instructions at the same time and perform multiple functions at the same time, and thus can combine to increase overall processing speed of the associated device.

One type of specialized processor element are graphics processor elements. Graphics processor elements are generally configured to use specialized hardware to perform the complex mathematical operations needed to quickly and accurately generate images, and thus can be used to provide those images without over burdening associated general purpose processors. One issue with some graphical processors is that they can be limited in their capabilities. For example, some graphical processor elements can be limited to blending a fixed number of graphical layers. This can limit on the number of layers that can be blended together which can constrain the complexity of the resulting image. As displays become bigger and include more pixels, such limitations in image quality become more noticeable. Thus, devices and techniques are needed for overcoming such constraints and improving image complexity.

DETAILED DESCRIPTION

The embodiments described herein provide devices and methods for image processing. Specifically, the embodiments described herein provide techniques for blending graphical layers together into an image for display. In general, these techniques utilize multiple display control units to blend together more layers than could be achieved using a single display control unit. This blending of additional layers can provide improved image complexity compared to traditional techniques that use only the blending capability of a single display control unit. Furthermore, these techniques can achieve this increased image quality without requiring excessive processing resources from outside of the display control unit. For example, this high image quality can be provided without requiring excessive processing resources of a general purpose processing unit on the device. For example, in a System on Chip (SoC) device with one or more central processing units and at least two display control units, the techniques can provide this improved image quality without excessively degrading the general purpose performance of the overall SoC device or its associated system.

As one example, the blending of graphical layers is facilitated by having a first display control unit blend a first plurality of graphical layers and output a first composed image to memory. A second display control unit reads the first composed image, and blends the first composed image with a second plurality of graphical layers to generate a final composed image. Because the blending capability of both the first display control unit and the second display control unit are utilized together, the final composed image can include graphical information from more graphical layers than could have been blended together using only one display control unit. Thus, increased image complexity can be provided, without relying on the central processing unit or other general purpose processing units on the device to perform the blending of layers.

Figure 1:
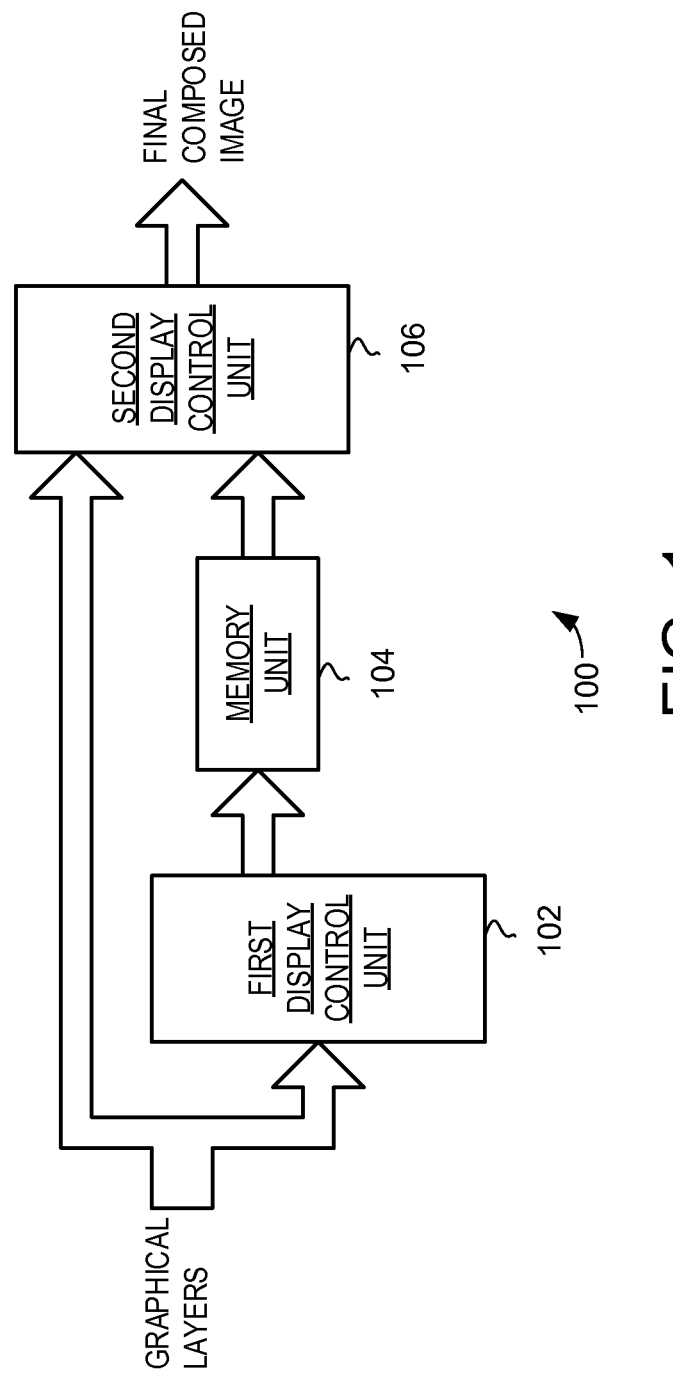
FIG. 1 is a schematic diagram of a processing unit in accordance with an exemplary embodiment.

Turning now to FIG. 1, a schematic view of a processing unit 100 is illustrated. The processing unit 100 includes a first display control unit 102, a memory unit 104, and a second display control unit 106. It should be noted that FIG. 1 illustrates a simplified example. Not illustrated in FIG. 1 are other elements that would typically be found on processing units such as processing unit 100. For example, not illustrated are general processing units, specialized network processing units, input/output processing layers, caches, etc.

In general, the first display control unit 102 and second display control unit 106 are both hardware modules (sometimes referred to as hardware engines) configured to fetch graphics stored in memory, process the graphics to compose images, and output the composed images to a display, such as to an LCD display panel. Such hardware modules can be fabricated on a chip with other devices, such as the general purpose processing units, network communication processing units, etc. Again, one such implementation is one of a SoC device. As specialized hardware modules, the first display control unit 102 and second display control unit 106 can be implemented to more efficiently perform graphics processing compared to general purpose devices.

In accordance with the embodiments described herein, the display control units 102 and 106 include the ability to read graphics layers from memory and blend those graphics layers together in real time. The display control units 102 and 106 can also include other image processing capabilities, such as image compression, graphics animations and interpolations, etc. These capabilities can facilitate the creation of dynamic video content while requiring very few resources from associated general purpose processing units. Furthermore, a typical display control unit will include I/O connections for displaying to a display screen such as an LCD display.

In FIG. 1, the first display control unit 102 is configured to receive a first plurality of graphical layers and blend the first plurality of graphical layers to generate a first composed image. The first display control unit 102 is further configured to write the first composed image to the memory unit 104. The second display control unit 106 is configured to receive a second plurality of graphical layers, and to read the first composed image from the memory unit 104. The second display control unit 106 is further configured to blend the second plurality of graphical layers and the first composed image to generate a final composed image. This final composed image can then be outputted to a display, such as an LCD display, coupled to the system. Because the blending capability of both the first display control unit 102 and the second display control unit 106 are utilized together, the final composed image outputted to the display can include more layers of graphical information than could have been blended together using only the first display control unit 102 or using only the second display control unit 106. Thus, increased image complexity can be provided, without relying on the central processing unit or other such elements to perform the blending of graphical layers.

In one embodiment, the memory unit 104 includes a first memory buffer and a second memory buffer. In such an embodiment the first display control unit 102 and the second display control unit 106 alternate between reading and writing the first memory buffer and the second memory buffer. Specifically, the first display control unit 102 is configured to switch between writing the first composed image to the first memory buffer and writing the first composed image to the second memory buffer. Likewise, the second display control unit 106 is configured to switch between reading the first composed image from the first memory buffer and reading the first composed image from the second memory buffer. Thus, this reading and writing would be performed in an alternating manner, with one display control unit writing to one memory buffer while the other display control unit reads from the other memory buffer. Then, when blending for a composed image is complete, the first display control unit 102 and the second display control unit 106 would switch to the alternate memory buffers. This allows the blending of a final composed image to be completed every cycle and can thus help avoid broken images.

In one embodiment, the alternating between the first memory buffer and the second memory buffer would be controlled by a buffer switch module. In one example, this buffer switch module can be implemented to process on an associated general purpose computer.

It should be noted that in this application, the term "blending" is defined as the combining of multiple graphical layers with a defined weighting, with the weighting commonly defining an associated transparency of the graphical layers. This operation is typically done on a pixel channel by pixel channel basis, such that the blending operation is performed once per channel (e.g., red, green, and blue channels) for each pixel, and repeated for as many graphical layers as are to be blended together. Thus, a typical blending operation can include multiple additions and multiplications per pixel, and as such blending operations can require a heavy processing load to the CPU if not instead performed by specialized hardware modules such as the first display control unit 102 and the second display control unit 106.

Figure 2:
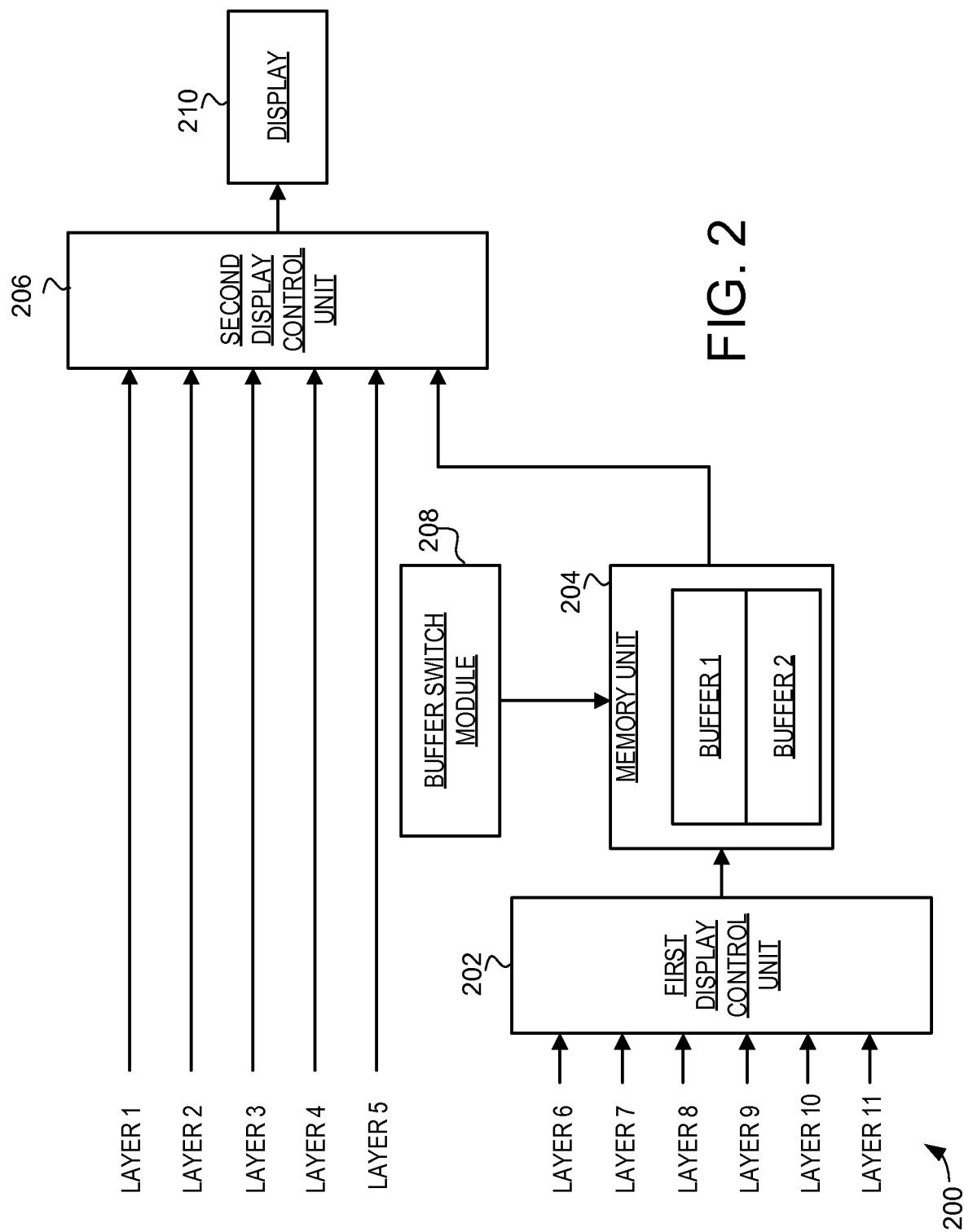
FIG. 2 is a schematic diagram of a second embodiment processing unit in accordance with an exemplary embodiment.

Turning now to FIG. 2, a schematic view of a processing unit 200 is illustrated. The processing unit 200 includes a first display control unit 202, a memory unit 204, a second display control unit 206, and a buffer switch module 208. The processing unit 200 is configured to output a composed image to a display 210. It should be noted that FIG. 2 again illustrates a simplified example. Not illustrated in FIG. 2 are other elements that would typically be found on processing units such as processing unit 200. For example, not illustrated are other hardware modules, general processing units, specialized network processing units, input/output processing layers, caches, etc.

In FIG. 2, the first display control unit 202 is configured to receive a first plurality of graphical layers and blend the first plurality of graphical layers to generate the first composed images. The first display control unit 202 is further configured to write the first composed images to the memory unit 204. The second display control unit 206 is configured to receive a second plurality of graphical layers, and to read the first composed images from the memory unit 204. The second display control unit 206 is further configured to blend the second plurality of graphical layers and the first composed images to generate the final composed images. These final composed images can then be outputted to the display 210.

In this illustrated embodiment, each of the display control units 202 and 206 include the ability to individually receive and blend six graphics layers. But when configured as illustrated in FIG. 2, the processing unit 200 can receive and blend eleven graphics layers. In one embodiment, each of these graphics layers would be received through a corresponding direct memory access (DMA) channel on the associated display control unit 202 and 206. To combine the display control units 202 and 206, one of the channels available for receiving graphics layers in the second display control unit 206 is instead used to receive the first composed image from the memory unit 204. Stated more generally, if the first display control unit 202 has the ability to receive M channels of graphics layers, and the second display control unit 204 has the ability to receive N channels of graphics layers, than the combined processing unit 200, when configured as illustrated, can have the ability to receive and blend together M+N−1 channels of graphics layers. Thus, increased image complexity can be provided without relying on the central processing unit or other such elements to perform the blending of graphical layers.

In this illustrated embodiment, memory unit 204 includes a first memory buffer (Buffer 1) and a second memory buffer (Buffer 2). During operation, the memory unit 204 operates a double buffer system. Specifically, the buffer switch module 208 operates to alternate the reading and writing of first composed images between the first memory buffer and the second memory buffer. More specifically, the buffer switch module 208 is configured to direct the first display control unit 202 to switch between writing the first composed images to the first memory buffer and writing the first composed images to the second memory buffer. Likewise, the buffer switch module 208 is configured to direct the second display control unit 206 to switch between reading the first composed images from the first memory buffer and reading the first composed images from the second memory buffer.

The buffer switch module 208 can be implemented in a wide variety of ways. For example, the buffer switch module 208 can be implemented as a hardware engine on the associated processing device. Alternatively, the buffer switch module 208 can be implemented as a program element being processed on the associated device, such as on an associated general purpose processor. In such an embodiment, the buffer switch module 208 can be implemented in an interrupt service routine (ISR) associated with the first display control unit 202 and the second display control unit 206. For example, the first display control unit 202 can be implemented to raise a first interrupt and set an EndOfBlending flag when the blending of the first composed image is completed. Likewise, the second display control unit 206 can be implemented to raise a second interrupt when the final composed image is displayed.

In this embodiment, when the EndOfBlending flag has been set the first and second memory buffers are switched, and a new blending cycle is started for both the first display control unit 202 and the second display control unit 204. However, if the first display control unit 202 has not finished blending its new composed image the EndOfBlending flag is not set and the second display control unit 204 will start a new blending cycle using the previous composed image while the first display control unit 202 continues to blend a new image. Thus, the first display control 202 and the second display control unit 204 can blend independently while using the EndOfBlending flag to synchronize activities and ensure that the second display control unit 204 uses the correct image data from the first display control unit 202.

Figure 3:
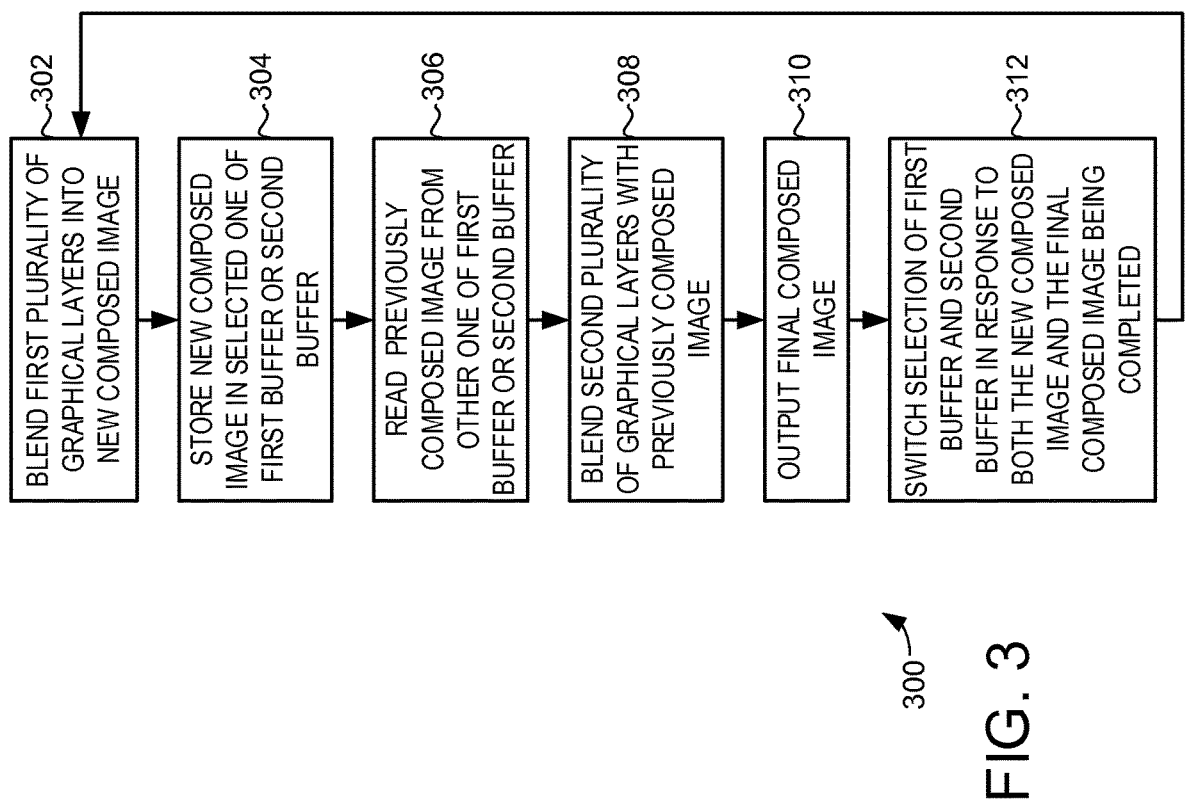
FIG. 3 is a flow diagram of an image processing method in accordance with an exemplary embodiment.

Turning now to FIG. 3, an exemplary method 300 for generating graphical images is illustrated. A step 302 is to blend a first plurality of graphical layers into a new composed image. As described above, a display control unit (e.g., display control unit 102 or 202) can be configured to receive and blend together a plurality of graphical layers (e.g., M graphical layers) without requiring the use of an associated general purpose processing. Such blending can be performed using any suitable blending technique.

The step 304 is to store the new composed image into a selected one of a first memory buffer and a second memory buffer. This storing of the new composed image can be accomplished by writing the new composed image into a memory address of a specified memory buffer. The step 306 is to read a previously composed first image from the other one of the first memory buffer or second memory buffer. Again, this reading of the previously composed image can be accomplished by reading the previously composed image from a memory address of a specified memory buffer. It should be noted that steps 304 and 306 would typically be performed simultaneously, with the new composed image being written to one memory buffer while the previously composed image is being read from the other memory buffer.

The step 308 is to blend the second plurality of graphical layers with the previously composed image. As described above, a second display control unit (e.g., second display control unit 202 or 206) can be configured to receive and blend together a second plurality of graphical layers (e.g., N graphical layers) with a previously composed image. This blending generates a final composed image, with the final composed image including information from both the first plurality of graphical layers and the second plurality of graphical layers (e.g., M+N−1 graphical layers).

The step 310 is to output the final composed image. For example, by outputting the final composed image through a display interface to an associated LCD display.

The step 312 is to switch the selection of the first memory buffer and the second memory buffer. This method then returns to step 302 for blending of graphical layers for the next composed image or frame. Thus, when steps 302-310 are performed for the next frame, the next new composed image will be stored in the alternate memory buffer while the previously generated composed image is read from the other memory buffer. This process can be continued as needed, generating new composed images suitable for displaying. Thus, increased image complexity can be provided, without relying on the central processing unit or other such elements to perform the blending of graphical layers.

In a first embodiment, a processing unit comprises: a first display control unit, wherein the first display control unit is configured to receive a first plurality of graphical layers and blend the first plurality of graphical layers to generate a first composed image; a memory unit, the memory unit coupled to the first display control unit and configured to receive and store the first composed image; and a second display control unit, wherein the second display control unit is coupled to the memory unit and is configured to receive a second plurality of graphical layers and the first composed image and blend the second plurality of graphical layers and the first composed image to generate a final composed image.

In a second embodiment, a processing unit comprises: a memory unit, the memory unit including a first memory buffer and a second memory buffer; buffer switch module coupled to the memory unit; a first display control unit coupled to the memory unit, wherein the first display control unit is configured to receive a first plurality of graphical layers and blend the first plurality of graphical layers together to generate first composed images, the first display control unit further configured to selectively write each of the first composed images to either the first memory buffer or the second memory buffer as selected by the buffer switch module; and a second display control unit coupled to the memory unit, wherein the second display control unit is configured to selectively read each of the first composed images from either the first memory buffer or the second memory buffer as selected by the buffer switch module, the second display control unit further configured to receive a second plurality of graphical layers and blend the second plurality of graphical layers together with the first composed image to generate second composed images, the second display control unit further configured to output the second composed images to a display interface.

In a third embodiment, a method comprises: blending a first plurality of graphical layers to generate a first composed image; writing the first composed image to a memory; reading the first composed image from the memory; and blending a second plurality of graphical layers with the first composed image to generate a final composed image.

For the sake of brevity, conventional techniques related to processor design may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. It should be understood that devices described herein may be implemented either in silicon or another semiconductor material or alternatively by software code representation thereof.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter. In addition, certain terminology may also be used in the foregoing description for the purpose of reference only, and thus are not intended to be limiting.

The terms "first," "second," "third," "fourth" and the like in the description and the claims are used for distinguishing between elements and not necessarily for describing a particular structural, sequential or chronological order. It is to be understood that the terms so used are interchangeable under appropriate circumstances. Furthermore, the terms "comprise," "include," "have" and any variations thereof, are intended to cover non-exclusive inclusions, such that a circuit, process, method, article, or apparatus that comprises a list of elements is not necessarily limited to those elements, but may include other elements not expressly listed or inherent to such circuit, process, method, article, or apparatus.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A processing unit, comprising:
   a memory unit, the memory unit including a first memory buffer and a second memory buffer;
   buffer switch module coupled to the memory unit;
   a first display control unit coupled to the memory unit, wherein the first display control unit is configured to receive a first plurality of graphical layers and blend the first plurality of graphical layers together to generate a first composed image for each blending cycle of the first display control unit, the first display control unit further configured to selectively write the first composed image to either the first memory buffer or the second memory buffer for each blending cycle of the first display control unit as selected by the buffer switch module;
   an EndOfBlending flag, the EndOfBlending flag configured to be selectively set by the first display control unit to indicate completion of the first composed image; and
   a second display control unit coupled to the memory unit, wherein the second display control unit is configured to selectively read each of the first composed images from either the first memory buffer or the second memory buffer as selected by the buffer switch module and when indicated by the EndOfBlending flag, the second display control unit further configured to receive a second plurality of graphical layers and blend the second plurality of graphical layers together with the first composed image to generate a second composed image for each blending cycle of the second display control unit, the second display control unit further configured to output the second composed image to a display interface for each blending cycle of the second display control unit.

2. The processing unit of claim 1, wherein the processing unit is integrated with at least one general purpose processor on a system on chip (SoC) device.

3. The processing unit of claim 2, wherein the buffer switch module is implemented with the general purpose processor.

* * * * *